US006411462B1

(12) United States Patent
Ostwald et al.

(10) Patent No.: US 6,411,462 B1
(45) Date of Patent: Jun. 25, 2002

(54) SMALL LIBRARY CARTRIDGE ACCESS MAIL SLOT METHOD

(75) Inventors: Timothy C. Ostwald, Louisville; Jon H. Benson, Superior, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/427,568

(22) Filed: Oct. 26, 1999

(51) Int. Cl.[7] ............................................... G11B 15/68
(52) U.S. Cl. .................... 360/92; 360/98.06; 369/35
(58) Field of Search ............... 360/92, 98.06; 369/34–38

(56) References Cited

U.S. PATENT DOCUMENTS

| | | | | |
|---|---|---|---|---|
| 4,779,151 A | | 10/1988 | Lind et al. ................. 360/92 |
| 5,278,708 A | * | 1/1994 | Apple et al. ................ 360/92 |
| 5,454,485 A | | 10/1995 | Dalziel .................... 221/83 |
| 5,700,125 A | * | 12/1997 | Falace et al. ............. 414/276 |
| 5,856,894 A | * | 1/1999 | Marlowe .................. 360/92 |
| 5,894,376 A | | 4/1999 | Rinard ................. 360/77.08 |
| 5,905,698 A | | 5/1999 | Iwamura et al. ........... 369/34 |
| 5,940,243 A | | 8/1999 | Kanetsuku et al. .......... 360/92 |
| 6,027,296 A | * | 2/2000 | Meier ................... 414/281 |
| 6,041,026 A | * | 3/2000 | Hammar et al. ............ 369/36 |
| 6,088,189 A | * | 7/2000 | Utsumi et al. ............. 360/92 |
| 6,097,566 A | * | 8/2000 | Heller et al. .............. 360/92 |
| 6,104,564 A | * | 8/2000 | Shibuya et al. ............. 360/69 |
| 6,198,594 B1 | * | 3/2001 | Utsumi et al. ............. 360/92 |
| 6,231,291 B1 | * | 5/2001 | Mueller et al. ............ 414/277 |

FOREIGN PATENT DOCUMENTS

| EP | 0238752 | 9/1987 |
|---|---|---|
| EP | 0427531 | 5/1991 |
| EP | 0866452 | 9/1998 |
| JP | 5-325361 | 12/1993 |

* cited by examiner

Primary Examiner—Jefferson Evans
(74) Attorney, Agent, or Firm—Brooks & Kushman P.C.

(57) ABSTRACT

A mail slot mechanism, a small automated storage library incorporating the mail slot mechanism, and method of operating the mail slot mechanism to insert and remove storage media cartridges from a small automated storage library are disclosed. The storage library includes an array of cartridge slots. Each cartridge slot is adapted to hold one storage media cartridge. One or more of these cartridge slots may function as the mail slot. Each mail slot has a top opening and a side opening through which one storage media cartridge can pass. The mail slot is disposed adjacent an opening in the storage library's housing and is pivotable between a user access position and a robot access position. A resilient member biases the mail slot toward the robot access position. A storage media cartridge may be manually inserted and removed through the top opening in the mail slot while the mail slot is at the user access position. The storage library's robotic mechanism may insert and remove one storage media cartridge at a time through the side opening in the mail slot while the mail slot is at the robot access position.

36 Claims, 3 Drawing Sheets

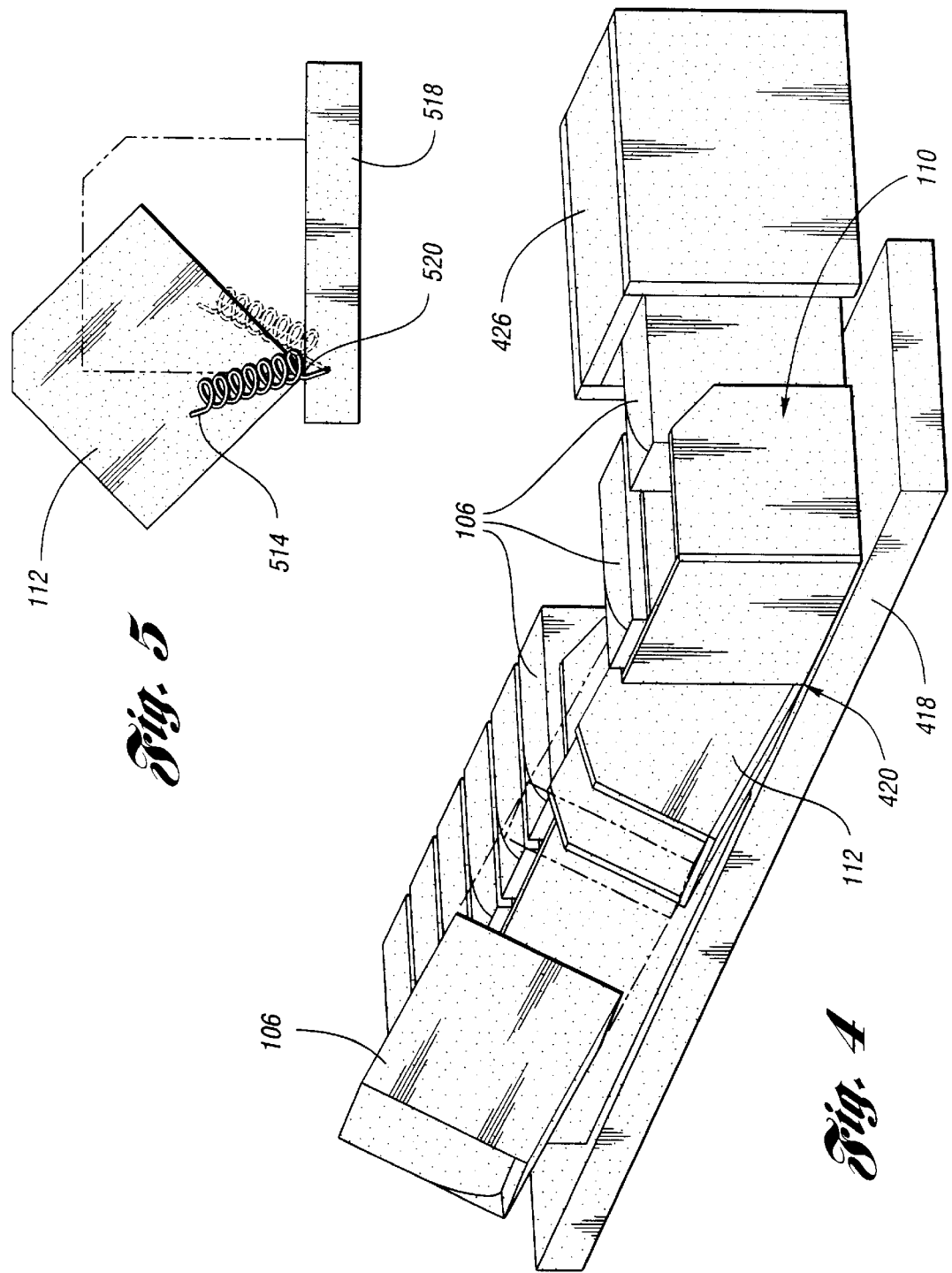

SMALL LIBRARY CARTRIDGE ACCESS MAIL SLOT METHOD

TECHNICAL FIELD

The present invention relates to the field of mechanisms and methods for inserting and removing storage media cartridges from storage libraries.

BACKGROUND ART

User access to storage media cartridges inside a small automated storage library is typically accomplished through the front face of the storage library's housing. This front access allows the storage library to be mounted in a standard rack or cabinet where the sides, top and bottom of the housing are hidden from the user. As such, there are tradeoffs in positioning of the storage media cartridges for accessibility by the human user and by the robotics. Early designs positioned all of the cartridges in a single row of cartridge slots positioned parallel to the front of the housing. The users directly inserted and removed these storage media cartridges in a horizontal plane through an opening in the exterior side of the cartridge slots. The robotics accessed the storage media cartridges horizontally through an opening in the interior side of the cartridge slots. This approach allowed for simple robotics while providing the user with access to all of the storage media cartridges held within the storage library.

Demands for increased capacity resulted in an increase in the number of storage media cartridges. Storage library designers started positioning some or all of the storage media cartridges away from the front face of the housing to keep the housing width within the nineteen-inch rack-mount requirement. As a result, the user could no longer directly access all of the storage media cartridges. Users had to rely on the robotics to transfer the storage media cartridges between a designated user accessible cartridge slot, or a special "mailbox" mechanism, and the other cartridge slots to insert new storage media cartridges into the storage library. The mailbox, or mail slot, is usually a specialized receptacle designed to rotate between two positions. In one position, an opening in the mail slot is positioned to face the user when manually receiving or dispensing one storage media cartridge. In the other position, the opening in the mail slot faces the robotic mechanism for automatic storage media cartridge insertion and removal. In contrast to the movable mail slot, the designated user accessible cartridge slot is typically stationary. The user accesses the slot through an external opening and the robotic mechanism accesses the slot through and internal opening.

Several mail slot mechanisms have been disclosed in U.S. Patents. For example, U.S. Pat. No. 5,894,367 issued to Rinard on Apr. 13, 1999, discloses a cylindrical-shaped mail slot that has a vertical opening for receiving the storage media cartridges. This mail slot is located between the front face of the storage library's housing and a ring of cartridge slots that form the primary storage location inside the library. The mail slot rotates about a vertical axis between two positions. At the first, or user access position, the opening faces the user for manual storage media cartridge insertion and removal. At the second, or robot access position, the opening in the mail slot faces the robotic mechanism mounted in the interior of the storage library. At both positions, the storage media cartridge is moved in a horizontal plane during insertion and removal from the mail slot. Since the mail slot is outside the primary ring of cartridge slots, a gap must be left in the ring to allow the robotic mechanism to reach through to access the mail slot.

U.S. Pat. No. 5,454,485, issued to Dalziel on Oct. 3, 1995 discloses a mail slot that pivots about a horizontal axis. This mail slot is a five-sided receptacle with one open side for receiving a storage media cartridge. The mail slot is located between the front face of the storage library's housing and a rotatable cylindrical carousel unit into which the cartridge slots are integrated. At the user access position, the mail slot extends at least partially out of the storage library's housing and the opening is facing upward. The user inserts and removes storage media cartridges in a vertical plane. Vertical insertion and removal are preferred as compared with horizontal insertion and removal from a human factor point of view. At the robot access position, the mail slot extends at least partially inside the housing and the opening of the mail slot is facing sideways toward the robotic mechanism. Robotic insertion and removal of the storage media cartridges are done in a horizontal plane. A latch is included in the mail slot to hold the mail slot at the robot access position. To transfer a storage media cartridge between the carousel of cartridge slots and the mail slot, the carousel must be rotated to align the appropriate cartridge slot with the mail slot.

In both the Rinard and the Dalziel disclosures, the mail slot is a stand-alone mechanism physically separate from the main array of cartridge slots. Such designs add complexity to the storage library design since the robotic mechanism must have a physical range of motion to access the array of cartridge slots and the mail slot. The stand-alone mail slots also consume valuable real estate inside the housings. This is an important factor for small storage libraries where space is very limited.

U.S. Pat. No. 4,779,151 issued to Lind et al. on Oct. 18, 1988 discloses a mail slot mechanism integrated with the main array of cartridge slots. Like the mail slots described above, the mail slot disclosed by Lind is a five-sided receptacle with an open side for receiving the storage media cartridges. It also rotates about a vertical axis between a user access position and a robot access position. Insertion and removal of storage media cartridges from the mail slot are performed in a horizontal plane by both the user and the robotic mechanism. An important feature of this design is that when the mail slot is at the robot access position, the mail slot itself forms part of a column of cartridge slots. The robotic mechanism accesses the mail slot in the same fashion as the other cartridge slots in the column of cartridge slots.

The design disclosed by Lind has limitations from a human factor perspective. First the storage media cartridges are inserted and removed from the mail slot with a horizontal plane of motion. As mentioned earlier, a vertical plane of motion is preferred for the user. Second, a tradeoff is made between packaging density of the storage media cartridges and free space around the mail slot required by the user to grasp a storage media cartridge in the mail slot. Free space left above and below the mail slot for the sake of the user is space not used to hold other storage media cartridges. Positioning adjacent storage media cartridges close to the mail slot leaves less room for the user to grasp the storage media cartridge in the mail slot.

What is desired is a mail slot mechanism that is integral to the main array of cartridge slots. This feature allows for efficient positioning of the storage media cartridges and permits a simple robotic mechanism design. The mail slot should also be movable away from the main array of cartridge slots. This feature allows the user adequate free space around the storage media cartridge in the mail box to grasp and remove the cartridge. Finally, the mail slot should be oriented to allow for vertical or near vertical insertion and removal of the storage media cartridges.

DISCLOSURE OF INVENTION

The present invention is a mechanism and a method for inserting and removing storage media cartridges from a storage library having an array of cartridge slots. At least one cartridge slot of the array is a mail slot. The mail slot is pivotable between a first position and a second position. A spring normally biases the mail slot toward the first position. At the first position, the mail slot is a continuation of the array of cartridge slots. With the mail slot at the first position, a robotic mechanism inside the housing can insert and remove a storage media cartridge through a side opening in the mail slot. At the second position, the mail slot is tilted to face, or protrude through an opening in the storage library's housing. Manual storage media cartridge insertion and removal from the mail slot are accomplished through a top opening in the mail slot with the mail slot in the second position.

In the preferred embodiment, the housing opening is covered by a door and the spring is disposed between the mail slot and the door. When the door is opened, the spring is decompressed and the mail slot pivots toward the second position. This provides the user with easy access to the mail slot. When the door is closed, the mail slot is pushed back into the array of cartridge slots. No motors, solenoids or actuators are required. In alternative embodiments, the spring may be disposed between the mail slot and the housing. In this case, the user must manually pull the mail slot to the second position.

A sensor may be included to detect when the mail slot is in the first position. Knowing when the mail slot is and is not at the first position is useful to the storage library's electronics. When the mail slot is not at the first position, the robotic mechanism may be locked-out from accessing the mail slot. When the mail slot returns to the first position, the storage media cartridge in the mail slot may be audited to determine its identity.

Accordingly, it is an object of the present invention to provide a mail slot mechanism permitting insertion and removal of storage media cartridges from a storage library.

Another object of the present invention is to provide a storage library having a mail slot mechanism permitting insertion and removal of storage media cartridges from the main array of cartridge slots.

Yet another object of the present invention is to provide a method of operating the array of cartridge slots to receive and discharge the storage media cartridges from the storage library.

These and other objects, features and advantages will be readily apparent upon consideration of the following detailed description in conjunction with the accompanying drawings.

BRIEF DESCRIPTION OF DRAWINGS

FIG. 4 is a partial perspective view of a third embodiment of the present invention; and FIG. 5 is a side view of a mail slot where the pivoting joint and spring are in an over-center arrangement.

BEST MODE FOR CARRYING OUT THE INVENTION

Figure 1:
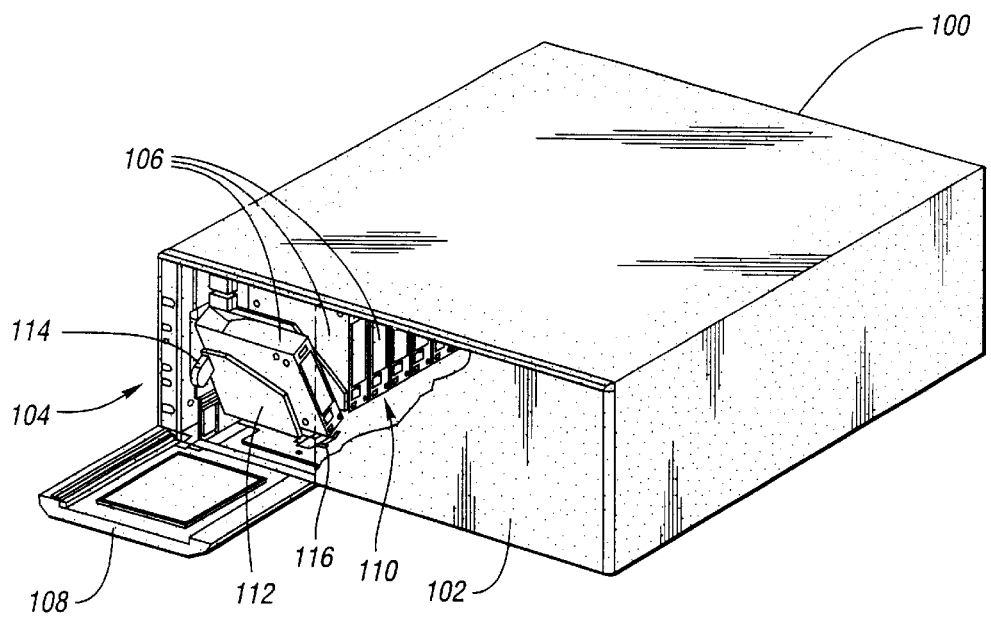
FIG. 1 is a perspective view of a storage library implementing the present invention.

A small automated storage library implementing the present invention is shown in FIG. 1. The storage library has a housing 100. Housing 100 is typically, although not necessarily, nineteen inches (483 millimeters) wide, seven to ten and one half inches (118 to 267 millimeters) tall and twenty-five or more inches (635 millimeters) deep. The storage library may by used in a freestanding desk-top arrangement, in a rack-mount arrangement, or in other similar arrangements.

Housing 100 has a front 102 that faces the user (not shown). This is the one side of the storage library that will be readily accessible when the storage library is mounted in a rack or cabinet. An opening 104 is provided in the front 102. The opening 104 is sufficiently large to allow the user to insert and remove at least one storage media cartridge 106 at a time.

Figure 2:
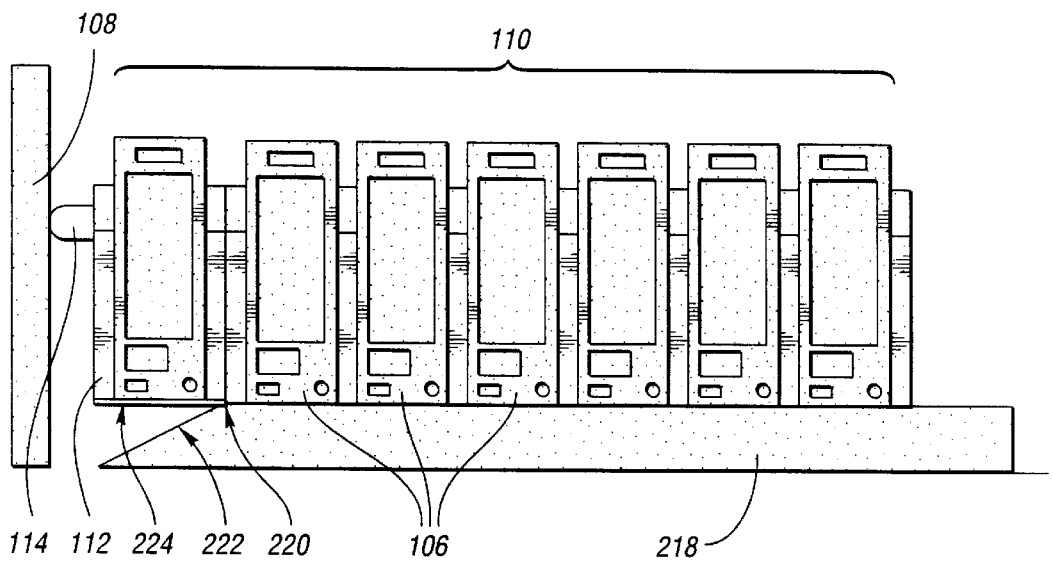
FIG. 2 is a partial side view of the storage library as seen from the inside of the storage library.

A door 108 is attached to the front 102 of the housing 100. Door 108 is movable between two positions, an open position (as shown in FIG. 1) and a closed position (as shown in FIG. 2). When in the closed position, the door 108 covers the opening 104. In the preferred embodiment, the door 108 is hinged along the bottom to the front 102 of the housing 100 and pivots between the two positions. Door 108 may be attached to the housing 100 in other ways. For example, door 108 may be slidably attached to the housing 100 and movable along the face of the front 102. In another example, the door 108 may be clipped to the housing 100 (the closed position) to cover the opening 104, and unclipped from the housing 100 (the open position) to clear the opening 104.

An array of cartridge slots 110 are mounted inside the housing 100 for holding the storage media cartridges 106. (A portion of the front 102 of the housing 100 near the opening 104 is drawn as transparent in FIG. 1 so that the array of cartridge slots 110 is more readily visible.) In the preferred embodiment, the array of cartridge slots 110 are oriented in a row substantially perpendicular to the front 102 of the housing 100. The end cartridge slot in the array of cartridge slots 110 nearest the opening 104 is designated as a "mail slot" 112. The mail slot 112 is situated near the opening 104 so that the user can insert and remove one storage media cartridge 106 at a time from the mail slot 112.

Mail slot 112 is a four-sided container that holds one storage media cartridge 106. As viewed from the inside of the housing 100, the mail slot 112 is solid on the left and right sides, the back, and the bottom. The top of mail slot 112 is open to allow the user to insert and remove the storage media cartridge 106. The side of the mail slot 112 that faces the robotic mechanism (not shown) is also open to allow the robotic mechanism access to the storage media cartridge 106. Mail slot 112 is pivotably connected to the housing 100 about a horizontal axis. FIG. 1 shows the mail slot 112 at a user access, or second position. FIG. 2 shows the mail slot 112 at a robot access, or first position. At the robot access position the side opening of the mail slot 112 is oriented vertically, or in parallel alignment with the other cartridge slots 110. At the user access position the top opening of the mail slot 112 is tilted to face or protrude through the opening 104 in the housing 100. In the preferred embodiment, the mail slot 112 remains within the housing 100 when at the user access position.

In the preferred embodiment, a spring 114, or other resilient member is used to bias the mail slot 112 toward the robot access, or first position. The force of the spring 114 is used to hold the mail slot 112 in the first position positively while the mail slot 112 is receiving and discharging a storage media cartridge 106. This bias toward the first position is helpful in the event that a slight misalignment between the mail slot 112 and the robotic mechanism results in a torque on the mail slot 112 while the robotic mechanism is inserting or removing a storage media cartridge 106. Spring 114 may be disposed between the mail slot 112 and the door 108, or between the mail slot 112 and the housing 100. In the preferred embodiment, the spring 114 is mounted on the mail slot 112 to engage the door 108 when the door 108 is near and at the closed position. Alternatively, the spring may be mounted to the door 108 to engage the mail slot 112 when the door 108 is closed. When the spring 114 is disposed between the mail slot 112 and the housing 100, it may be mounted with one end attached to the mail slot 112 and the other end attached to the housing 100.

In alternative embodiments, other types of keeper devices may be employed to hold or capture the mail slot 112 at the robot access position. For example, a pair of attracting magnets (not shown) may be mounted with one attached to the mail slot 112 and the other attached to a neighboring cartridge slot of the array of cartridge slots 110. When the mail slot 112 is in the robot access position, the attractive force between the two magnets holds the mail slot 112 at the robot access position. To move the mail slot 112, the user must pull the mail slot 112 away from the robot position with a force greater than the attractive force between the two magnets. In another example, a detent mechanism (not shown) may be used to hold the mail slot 112 at the robot access position. Here, the user must push the mail slot 112 toward the robot access position to catch a disengaged detent mechanism, and away from the robot access position to release a captured detent mechanism. Other types of devices known in the art for biasing, capturing and holding the mail slot 112 at the robot access position may also be employed.

A sensor 116 is included in the preferred embodiment to monitor the position of the mail slot 112. The sensor 116 is disposed between the mail slot 112 and the housing 100 and is used to inform the storage library's electronics (not shown) when the mail slot 112 is and is not at the robotic access position. This information may be used by the electronics to prevent the robotic mechanism from attempting to insert or remove a storage media cartridge 106 from the mail slot 112 when the mail slot 112 is not aligned for such an operation. In storage libraries that include a bar code reader mounted on the robotic mechanism, this information may also be used to prevent the bar code reader from attempting to read a bar code on the storage media cartridge 106 in the mail slot 112. Finally, information from the sensor 116 informs the electronics when the mail slot 112 has left, and then returned to the robot access position. When this sequence happens, the electronics may be programmed to audit the mail slot 112 to learn what the user has done. Auditing will generally involve checking for the presence or absence of a storage media cartridge 106 in the mail slot 112, and if present, reading the bar code on that storage media cartridge 106. Results from the audit will inform the electronics if an existing storage media cartridge 106 has been removed from the storage library, a new storage media cartridge 106 has been inserted, or if the door 106 was simply opened and then closed.

FIG. 2 is a partial view of the storage library with the mail slot 112 in the robot access position. The mail slot 112 and the rest of the array of cartridge slots 110 are mounted on a base 218 that is attached to the housing 100. A pivoting joint 220 attaches the mail slot 112 to the base 218. The pivoting joint 220 is attached to an edge of the mail slot 112 furthest from the front 102 of the housing 100. A beveled edge 222 in the base 218 below the mail slot 112 provides room for the mail slot 112 to pivot to the user access position. In the preferred embodiment, the pivoting joint 220 and beveled edge 222 are arranged so that gravity biases the mail slot 112 toward the user access position. This embodiment does not need motors, actuators or other springs to cause the mail slot 112 to move from the robot access position to the user access position when the door 108 is opened. Once the door 108 has been opened, the mail slot 112 pivots until the bottom side 224 of the mail slot 112 rests against the beveled edge 222 of the base 218. Preferably the beveled edge 222 defines the angle of the mail slot 112 at the user access position. Preferably, the mail slot 112 is tilted less than 45 degrees from the vertical robot access position, although other angles are possible.

A method of inserting a new storage media cartridge 106 into the storage library under the present invention is as follows. First, the user moves the door 108 to the open position. As the door moves away from the mail slot 112, the spring 114 is decompressed. Gravity then forces the mail slot 112 to pivot with the top of the mail slot 112 moving toward the opening 104 in the front 102 of the housing 100. Sensor 116 outputs a signal indicating that the mail slot 112 is no longer at the robotic position as the mail slot 112 falls toward the opening door 108. The electronics inhibit the robotic mechanism and bar code reader from accessing the mail slot 112 in response to the sensor 116 signal. Mail slot 112 stops pivoting when the bottom side 224 of the mail slot 112 engages the beveled edge 222 of the base 218. Next, the mail slot 112 receives the new storage media cartridge 106 from the user through the top opening in the mail slot 112. The user then pushes the door 108 back to the closed position. As the door 108 is closing, it engages the spring 114. The spring 114 transfers the force closing the door 108 to the mail slot 112 causing it to move toward the closed position. Mail slot 112 stops moving at the robot access position when its engages the adjacent cartridge slot. The sensor 116 once again detects that the mail slot 112 is again at the robot access position and outputs an appropriate signal to the electronics. The storage media cartridge 106 in the mail slot 112 may now be discharged through the front opening of the mail slot 112 to the robotic mechanism, and the bar code on the storage media cartridge 106 may be read by the bar code reader.

A method of removing a desired storage media cartridge 106 from the storage library is as follows. First, the robotic mechanism removes the storage media cartridge 106 currently residing in the mail slot 112 from the mail slot 112, if that storage media cartridge 106 is not the desired storage media cartridge 106 to be removed from the storage library. Next, the mail slot 112 receives the desired storage media cartridge 106 from the robotic mechanism. The user then opens the door 108 causing the mail slot 112 to pivot toward the user access position and the sensor 116 to output a signal to the electronics that the mail slot 112 is no longer at the robot access position. The user removes the desired storage media cartridge 106 from the mail slot 112 through the top opening in the mail slot 112, then pushes the door 108 back to the closed position. Closing the door causes the spring 114 to move the mail slot 112 back to the robot access position. Sensor 116 responds to the mail slot 112 returning to the robot access position by outputting the appropriate signal to the electronics. Finally, the mail slot 112 is audited to learn if the user did in fact remove the desired storage media cartridge 106, and to see if the user inserted a new storage media cartridge 106 before closing the door 108.

Figure 3:
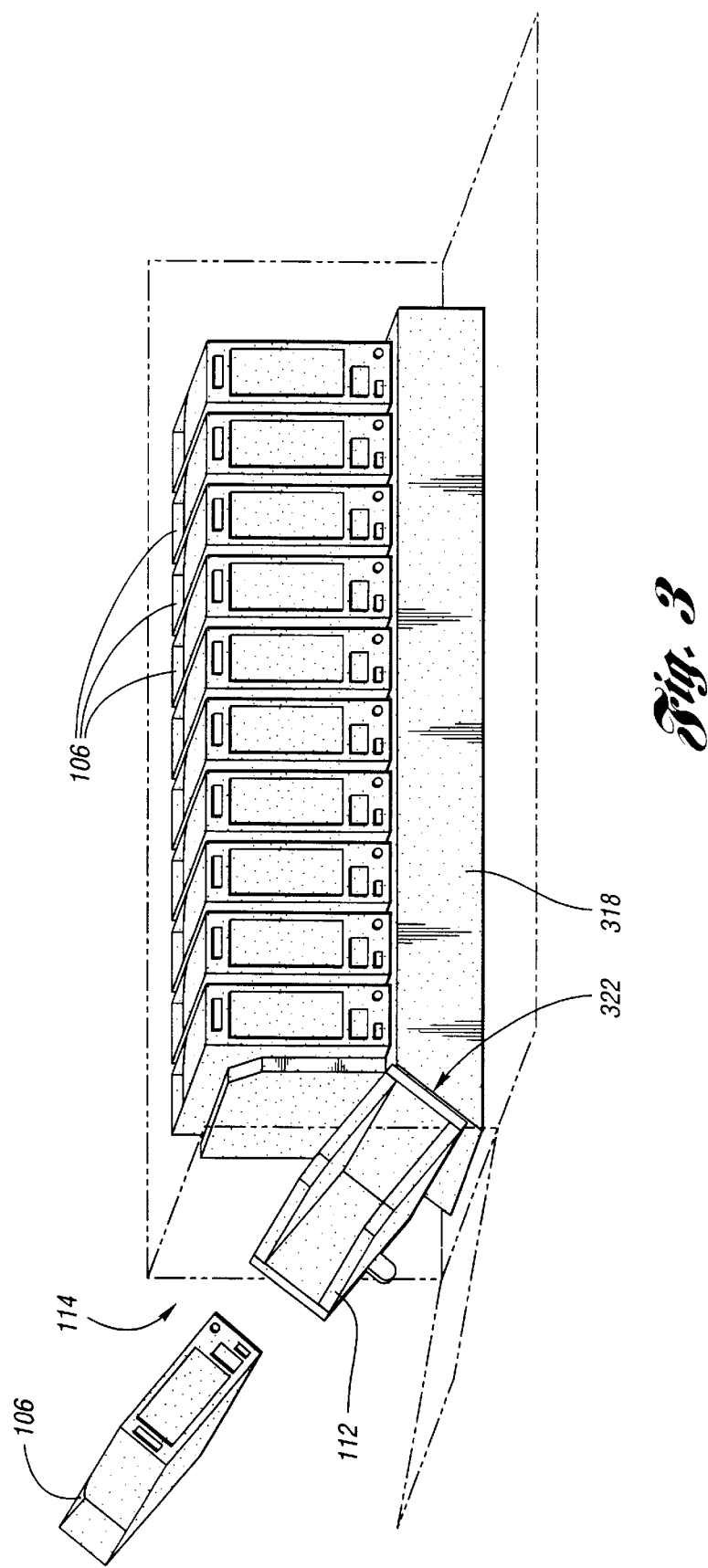
FIG. 3 is a partial perspective view of a second embodiment of the present invention.

FIG. 3 shows a second embodiment on the present invention. In this embodiment, the mail slot 112 traverses through the opening 104 when pivoting between the user access position (as shown in FIG. 3) and the robot access position (as shown in FIG. 2). This embodiment positions the top opening of the mail slot 112 outside the housing 100 when the mail slot 112 is at the user access position. The resulting extra clearance between the mail slot 112 and the housing 100 makes it easier for the user to grab the storage media cartridges 106 as it sits in the mail slot 112. To allow the mail slot 112 to protrude through the opening 104, the base 318 must be taller and the beveled edge 322 steeper than the base 218 and beveled edge 222 of the embodiment shown in FIG. 2.

A third embodiment of the present invention is shown in FIG. 4. In this embodiment, the array of cartridge slots 110 are oriented substantially parallel and adjacent to the front (not shown) of the storage library's housing (not shown). This third embodiment is useful in storage library configurations where the robotic mechanism 426 moves parallel to the front of the housing over at least part of its range of motion. Since multiple cartridge slots of the array of cartridge slots 410 are adjacent to the front of the housing, one or more of the cartridge slots can be mail slots 112. With multiple mail slots 112, each mail slot 112 can pivot independently, or several mail slots 112 can be joined together to pivot as one unit.

Another feature shown in FIG. 4 is the positioning of the pivoting joint 420 on the bottom of the mail slot 112. Here, the pivoting point 420 is attached to the edge of the mail slot 112 closest to the front of the housing. As a result, the beveled edge of the base 418 is not required. This allows the base 418 to be shorter than the base 218 shown in FIG. 2. Gravity now forces the mail slot toward the robot access position instead of the user access position, as in the preferred embodiment. This requires the user to pull the mail slot 112 toward the user access position manually. A spring (not shown) or other resilient member may be used for biasing the mail slot 112 toward the robot access position to insure that the mail slot 112 is not accidently bumped away from the robot access position. This arrangement can also be applied to the embodiment shown in FIG. 2. Referring back to FIG. 2, by eliminating the beveled edge 222 and attaching the pivoting joint 220 to the edge of the mail slot 112 closets to the door 108, gravity biases the mail slot 112 toward the robot access position. Here the door 108 of the storage library can be opened for reasons other that inserting or removing a storage media cartridge 106 without the mail slot 112 automatically falling to the user access position.

FIG. 5 shows an embodiment where an extension spring 514 biases the mail slot 112 toward both the user access position (shown in solid) and the robot access position (shown in phantom). In this embodiment, the extension spring 514 is coupled between the mail slot 112 and base 518 in an over-center arrangement with the pivoting joint 520. When the mail slot 112 is near and at the user access position, the top of the extension spring 518 is to the left (as seen in the figure) of the pivoting joint 520 and thus biases the mail slot 112 toward the user access position. When the mail slot 112 is near and at the robot access position, the top of the extension spring 518 is to the right of the pivoting joint 520 and thus biases the mail slot 112 toward the robot access position. This over-center arrangement is helpful in holding the mail slot 112 stationary at the user access position if the user bumps the mail slot 112 with the storage media cartridge 106 while inserting the storage media cartridge 106.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A storage library for housing a plurality of storage media cartridges, the storage library comprising:
   a housing having an opening;
   a plurality of cartridge slots each having a first opening and being disposed inside the housing to hold the plurality of storage media cartridges, wherein at least one cartridge slot of the plurality of cartridge slots is a mail slot, wherein the mail slot disposed adjacent to the opening in the housing, is pivotable between a first position and a second position, and has a second opening that is disposed on a top of the mail slot as defined with the mail slot at the first position, wherein manual insertion of one storage media cartridge at a time into the mail slot and manual removal of one storage media cartridge at a time from the mail slot are accomplished at least partially through the second opening in the mail slot while the mail slot is at the second position; and
   a robotic mechanism disposed inside the housing and operative to move the plurality of storage media cartridges one at a time among the plurality of cartridge slots including the mail slot, wherein the robotic mechanism inserts one storage media cartridge at a time into the mail slot and removes one storage media cartridge at a time from the mail slot through the first opening in the mail slot when the mail slot is at the first position.

2. The storage library of claim 1 wherein the mail slot is biased toward the second position by gravity.

3. The storage library of claim 1 further comprising a resilient member biasing the mail slot toward the first position.

4. The storage library of claim 3 further comprising a door attached to the housing and aligned with the opening in the housing, the door having an open and a closed position, wherein the resilient member is disposed between the door and the mail slot to bias the mail slot toward the first position when the door is at the closed position.

5. The storage library of claim 3 wherein the resilient member engages the mail slot in an over-center arrangement to bias the mail slot toward the first position when the mail slot is at the first position, and toward the second position when the mail slot is at the second position.

6. The storage library of claim 1 further comprising a keeper device engaging the mail slot for holding the mail at the first position.

7. The storage library of claim 1 further comprising a sensor in communication with the mail slot and operative to detect when the mail slot is at the first position.

8. The storage library of claim 1 wherein the mail slot protrudes through the opening in the housing when the mail slot is at the second position.

9. The storage library of claim 1 wherein the cartridge slots are oriented in a horizontal row.

10. The storage library of claim 1 wherein the housing has a front and the opening of the housing is provided in the front, and wherein the cartridge slots are oriented in a row that extends in a direction substantially perpendicular to the front.

11. The storage library of claim 10 wherein the row extends horizontally.

12. A mechanism for permitting a storage media cartridge to be manually inserted into and removed from a housing having an opening, the mechanism comprising:

a mail slot for holding the storage media cartridge, the mail slot having a first opening and a second opening, the mail slot being disposed adjacent the opening in the housing, and being pivotable between a first position and a second position, wherein storage media cartridge insertion into and removal from the mail slot are accomplished through the first opening in the mail slot when the mail slot is at the first position, and wherein storage media cartridge manual insertion into and removal from the mail slot are accomplished at least partially through the second opening in the mail slot when the mail slot is at the second position; and a resilient member that engages the mail slot in an over-center arrangement to bias the mail slot toward the first position when the mail slot is at the first position, and toward the second position when the mail slot is at the second position.

13. The mechanism of claim 12 wherein the mail slot is biased toward the second position by gravity.

14. The mechanism of claim 12 further comprising a keeper device engaging the mail slot for holding the mail slot at the first position.

15. The mechanism of claim 12 wherein the second opening of the mail slot is on a top of the mail slot as defined with the mail slot at the first position.

16. The mechanism of claim 12 further comprising a sensor in communication with the housing and operative to detect when the mail slot is at the first position.

17. A method of operating a plurality of cartridge slots, wherein each cartridge slot of the plurality of cartridge slots has a first opening, and at least one cartridge slot of the plurality of cartridge slots is a mail slot having a second opening, the method comprising:

allowing the mail slot to pivot between a first position and a second position;

allowing gravity to bias the mail slot toward the second position;

receiving and discharging one storage media cartridge at a time through the first opening of each cartridge slot of the plurality of cartridge slots, including the mail slot when the mail slot is at the first position; and receiving and discharging one storage media cartridge at a time at least partially through the second opening of the mail slot when the mail slot is at the second position.

18. The method of claim 17 further comprising resiliently biasing the mail slot toward the first position.

19. The method of claim 18 further comprising resiliently biasing the mail slot toward the second position when the mail slot is at the second position.

20. The method of claim 17 further comprising capturing the mail slot at the first position.

21. The method of claim 17 further comprising detecting when the mail slot is at the first position.

22. The method of claim 17 wherein the plurality of cartridge slots are disposed inside a housing having an opening, the method further comprising traversing the second opening of the mail slot through the opening in the housing when the mail slot is pivoted between the first position and the second position.

23. A storage library for housing a plurality of storage media cartridges, the storage library comprising:

a housing having an opening;

a plurality of cartridge slots disposed inside the housing and being configured to hold the plurality of storage media cartridges, each cartridge slot having a first opening, one cartridge slot being a mail slot, wherein the mail slot is disposed adjacent to the opening in the housing, is pivotable between a first position and a second position, is biased toward the second position by gravity, and has a second opening, and wherein manual insertion of one storage media cartridge at a time into the mail slot and manual removal of one storage media cartridge at a time from the mail slot are accomplished at least partially through the second opening in the mail slot while the mail slot is at the second position; and a robotic mechanism disposed inside the housing and operative to move the plurality of storage media cartridges one at a time among the plurality of cartridge slots including the mail slot, wherein the robotic mechanism inserts one storage media cartridge at a time into the mail slot and removes one storage media cartridge at a time from the mail slot through the first opening in the mail slot when the mail slot is at the first position.

24. The storage library of claim 1 wherein the second opening of the mail slot is on a top of the mail slot as defined with the mail slot at the first position.

25. A storage library for housing a plurality of storage media cartridges, the storage library comprising:

a housing having an opening;

a door attached to the housing and being alignable with the opening in the housing, the door being movable between an open position and a closed position;

a plurality of cartridge slots disposed inside the housing and being configured to hold the plurality of storage media cartridges, each cartridge slot having a first opening, one cartridge slot being a mail slot, wherein the mail slot is disposed adjacent to the opening in the housing, is pivotable between a first position and a second position, and has a second opening, and wherein manual insertion of one storage media cartridge at a time into the mail slot and manual removal of one storage media cartridge at a time from the mail slot are accomplished at least partially through the second opening in the mail slot while the mail slot is at the second position;

a resilient member disposed between the door and the mail slot to bias the mail slot toward the first position when the door is at the closed position; and a robotic mechanism disposed inside the housing and operative to move the plurality of storage media cartridges one at a time among the plurality of cartridge slots including the mail slot, wherein the robotic mechanism inserts one storage media cartridge at a time into mail slot and removes one storage media cartridge at a time from the mail slot through the first opening in the mail slot when the mail slot is at the first position.

26. The storage library of claim 25 wherein the mail slot is biased toward the second position by gravity.

27. The storage library of claim 25 wherein the second opening of the mail slot is on a top of the mail slot as defined with the mail slot at the first position.

28. The storage library of claim 25 wherein the resilient member is mounted on the mail slot.

29. A storage library for housing a plurality of storage media cartridges, the storage library comprising:

a housing having an opening;

a plurality of cartridge slots disposed inside the housing and being configured to hold the plurality of storage media cartridges, each cartridge slot having a first opening, one cartridge slot being a mail slot, wherein the mail slot is disposed adjacent to the opening in the housing, is pivotable between a first position and a second position, and has a second opening, and wherein manual insertion of one storage media cartridge at a time into the mail slot and manual removal of one storage media cartridge at a time from the mail slot are accomplished at least partially through the second opening in the mail slot while the mail slot is at the second position;

a resilient member that engages the mail slot in an over-center arrangement to bias the mail slot toward the first position when the mail slot is at the first position, and toward the second position when the mail slot is at the second position; and a robotic mechanism disposed inside the housing and operative to move the plurality of storage media cartridges one at a time among the plurality of cartridge slots including the mail slot, wherein the robotic mechanism inserts one storage media cartridge at a time into the mail slot and removes one storage media cartridge at a time from the mail slot through the first opening in the mail slot when the mail slot is at the first position.

30. A mechanism for permitting a storage media cartridge to be manually inserted into and removed from a housing having an opening, the mechanism comprising a mail slot for holding the storage media cartridge, the mail slot having a first opening and a second opening, the mail slot being disposed adjacent the opening in the housing and being pivotable between a first position and a second position, the mail slot further being biased toward the second position by gravity, wherein storage media cartridge insertion into and removal from the mail slot are accomplished through the first opening in the mail slot when the mail slot is at the first position, and wherein storage media cartridge manual insertion into and removal from the mail slot are accomplished at least partially through the second opening in the mail slot when the mail slot is at the second position.

31. A mechanism for permitting a storage media cartridge to be manually inserted into and removed from a housing having an opening, the mechanism comprising a mail slot for holding the storage media cartridge, the mail slot having a first opening and a second opening, the mail slot being disposed adjacent the opening in the housing and being pivotable between a first position and a second position, the second opening in the mail slot being disposed on top of the mail slot as defined with the mail slot at the first position, wherein storage media cartridge insertion into and removal from the mail slot are accomplished through the first opening in the mail slot when the mail slot is at the first position, and wherein storage media cartridge manual insertion into and removal from the mail slot are accomplished at least partially through the second opening in the mail slot when the mail slot is at the second position.

32. The mechanism of claim 12 further comprising a resilient member biasing the mail slot toward the first position.

33. The mechanism of claim 32 wherein the resilient member engages the mail slot in an over-center arrangement to bias the mail slot toward the first position when the mail slot is at the first position, and toward the second position when the mail slot is at the second position.

34. The storage library of claim 32 wherein the cartridge slots are oriented in a horizontal row.

35. The storage library of claim 32 wherein the housing has a front and the opening of the housing is provided in the front, and wherein the cartridge slots are oriented in a row that extends in a direction substantially perpendicular to the front.

36. The storage library of claim 35 wherein the row extends horizontally.

* * * * *